Feb. 12, 1957     H. C. GRANT, JR     2,781,505

TEMPERATURE RESPONSIVE SYSTEM

Filed Oct. 18, 1952

INVENTOR.
*Harry C. Grant, Jr.*
BY
*Ernest A. Joenen*
ATTORNEY

United States Patent Office 2,781,505
Patented Feb. 12, 1957

2,781,505

TEMPERATURE RESPONSIVE SYSTEM

Harry C. Grant, Jr., Ridgewood, N. J., assignor to Specialties Development Corporation, Belleville, N. J., a corporation of New Jersey Application October 18, 1952, Serial No. 315,586

3 Claims. (Cl. 340—233)

The present invention relates to temperature responsive systems which indicate an abnormal temperature caused for example by a fire, and, more particularly, to such systems utilizing a heat detecting element comprising two or more spaced apart conductors of electricity having therebetween a material which has one resistance at a normal temperature and another resistance at a predetermined other temperature, so that a change in the amount of current flowing between the conductors effects the operation of a relay or other responsive device for controlling an alarm circuit.

One of the difficulties encountered in connection with such systems is that the resistance of the material between the conductors varies over a considerable range as the temperature condition to be detected is approached. For example, as the resistance changes due to a change in temperature, some current will pass through the relay to partially energize the same whereby the operated element thereof is moved or tends to move towards its circuit closing position. Should the relay be subjected to vibrations caused by an aircraft engine while in this condition, the relay element may be caused to move into a circuit closing position and give a false indication.

Accordingly, an object of the present invention is to provide a system of the type described herein which is not subject to any of the foregoing difficulties and disadvantages.

Another object is to provide such a system wherein there is no relay movement until the resistance of the detecting element is of a predetermined value.

Another object is to provide for easily changing the response characteristic to meet varying requirements.

Another object is to accomplish the foregoing without the utilization of complicated circuits or devices.

A further object is to provide such a system which is simple and economical in construction and can be readily assembled, and wherein the control circuit thereof occupies only a small space and is light in weight.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing a temperature responsive system comprising an unbalanced bridge circuit or network having in one branch thereof an element adapted to be positioned in a zone subject to variations in temperature to indicate a predetermined temperature therein, the element including at least two spaced conductors of electricity spaced apart by material having one resistance at a normal temperature and having another resistance at a predetermined other temperature; means for supplying current to the branches of the circuit; means responsive to the flow of current connected across the branches of the circuit; and blocking means arranged in the circuit for permitting the flow of current through the current responsive means substantially only in a single direction.

A preferred embodiment of the invention has been chosen for purposes of illustration and description, and is shown in the accompanying drawing, forming a part of the specification, wherein.

Figure 1:
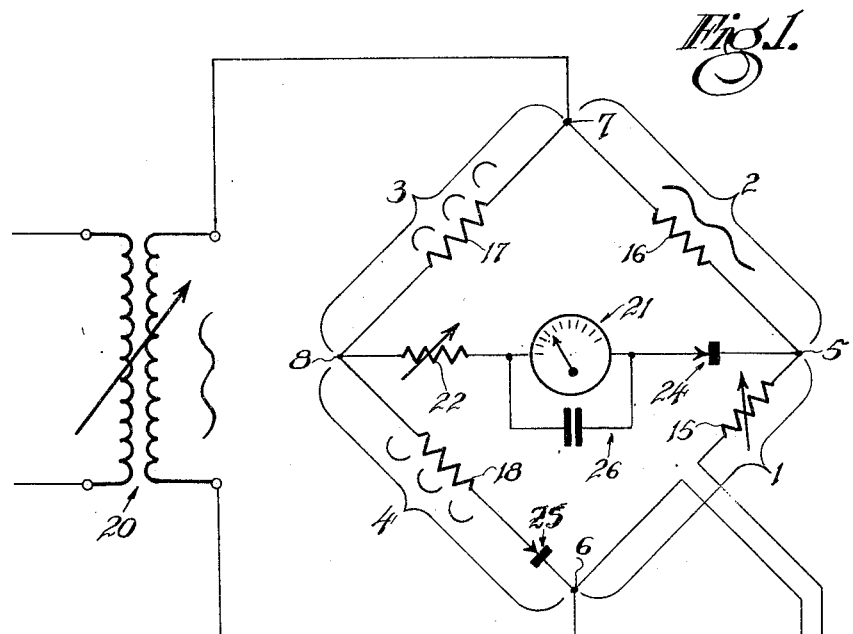
Fig. 1 is a circuit diagram of a temperature responsive or fire detecting system embodying the present invention.

Referring to the drawing in detail and more particularly to Figure 1 thereof, there is shown a temperature responsive or fire detecting system which essentially comprises an unbalanced bridge circuit having two branches. The first branch includes a first arm 1 and a second arm 2, and the second branch includes a third arm 3 and a fourth arm 4. The ends of the first arm are connected to one end of the second and fourth arms, respectively, at 5 and 6; and the ends of the third arm are connected to the other end of the second and fourth arms, respectively, at 7 and 8, to establish the circuit.

The first arm 1 has an element 10 of any desired length connected therein which is positioned in a space remotely located with respect to the other elements of the circuit. This space is subject to variations in temperature due to a fire or other abnormal conditions, and the element 10 serves to detect such conditions as will be more fully understood in the light of the description hereinafter. If desired, two or more such elements may be connected in series.

Generally, the element 10 comprises two spaced conductors of electricity 11 and 12 each having a known resistance, and a material 14 in contact with and spacing the conductors apart. This material has one resistance at normal temperatures and has another resistance at a predetermined other temperature so that the amount of current flowing between the conductors varies with changes in temperature. The material may have either a positive or a negative temperature coefficient of resistivity, and may have practically any resistance range over given temperatures. However, for the purpose of more clearly illustrating the present invention by way of example, the element 10 may have a negative coefficient of resistivity, a normal temperature resistance of about twenty million ohms, and a predetermined abnormal temperature resistance of about twenty thousand ohms.

If desired, the first arm 1 may have a resistor 15 connected therein in series with the element 10 to limit the overall resistance in this arm to a known value should the resistance of the element 10 change too severely, for example, should its resistance become negligible due to an extreme temperature condition. This resistor may be variable to change the responsive characteristic of the element 10, but a replaceable fixed resistor of a known resistance is preferred because of its relative cheapness and compactness.

The second arm 2, the third arm 3 and the fourth arm 4 have fixed resistors 16, 17 and 18, respectively, connected therein, these resistors having a known predetermined resistance of a value to provide an unbalanced bridge circuit at normal temperatures or the responsive temperature and to provide a balanced circuit only at a predetermined intermediate temperature. For example, the resistance of the second arm and the resistance of the first arm, when the element 10 is at the predetermined or balancing temperature, have a predetermined ratio, and the resistance of the third arm and the resistance of the fourth arm have a fixed predetermined ratio. These ratios preferably are identical just before the element 10 is at its responsive temperature. However, due to the nature of the element 10, the resistance ratios are unequal at all other temperatures whereby the circuit is normally unbalanced. As a practical illustration, the arms may have the following resistances under various conditions:

| Arm | Resistance at Normal Temperature, ohms | Resistance at Balancing Temperature, ohms | Resistance at Responsive Temperature, ohms |
| --- | --- | --- | --- |
| 1 | 20,000,000 | [1] 25,000 | [1] <25,000 |
| 2 | 50,000 | 50,000 | 50,000 |
| 3 | 5,000 | 5,000 | 5,000 |
| 4 | 2,500 | 2,500 | 2,500 |

[1] Including the limiting resistor 15 having a resistance of about 5,000 ohms.

A source 20 for supplying current to the two branches of the circuit has one side connected thereto at 6 and has the other side connected thereto at 7, a current responsive means 21, such as a direct current device, is connected across the branches at 5 and 8 thereof. A resistance element 22 may be connected in series with the direct current device to determine its range of sensitivity. For example, a variable resistor may be connected between the device and the point 8 in the bridge, although it will be understood that a resistor having a predetermined fixed resistance may be utilized, if desired, or that the resistor may be omitted entirely.

Figure 2:
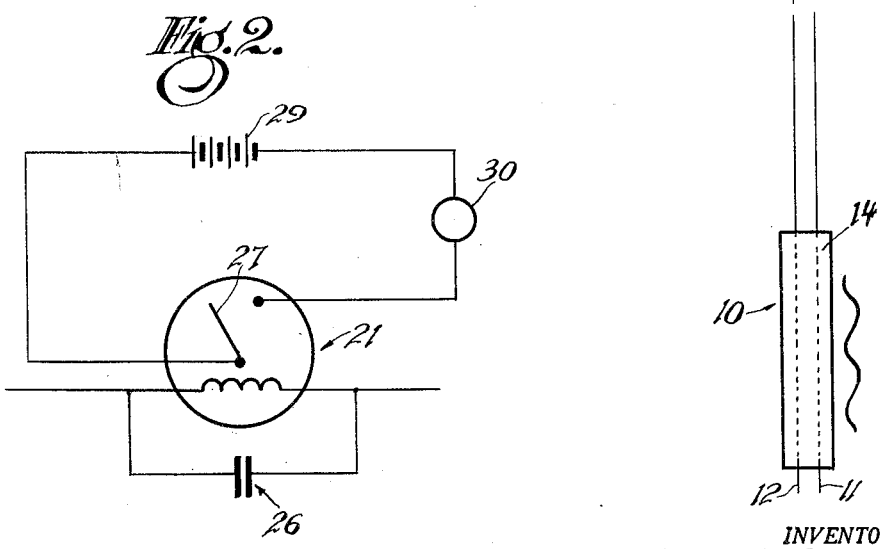
Fig. 2 is a circuit diagram of an alarm circuit under the control of the current responsive means.

In Fig. 2, the device 21 is illustrated as a sensitive direct current relay having a needle 27 which serves as a switch arm for controlling an alarm circuit including a source of electrical energy 29 and an alarm or signal 30 of the visible and/or audible type.

When direct current is supplied to the network as so far described while the element 10 is at normal temperatures or temperatures at which a response is desired, with the positive side at 7 and the negative side at 6, current will tend to flow through the responsive device 21 from point 5 to point 8, that is, in a direction from right to left as viewed. Such flow of current however, is prevented by a blocking device or half wave rectifier 24 connected between the point 5 and the device 21. When the element 10 is subjected to the predetermined balancing temperature, the resistance of the arm 1 decreases to a value whereby the network is balanced and no current tends to flow across the branches thereof. When the predetermined responsive temperature is reached or is slightly exceeded, the resistance of the arm 1 further decreases to a value whereby the network is again unbalanced and current flows through the device 21 from point 8 to point 5, that is, in a direction from left to right as viewed, and the device 21 responds because the blocking device 24 permits current to flow in such direction.

By reason of the fact that the device 21 responds only upon a change in direction of the flow of current and at all other times has no current passing therethrough, the device may be very sensitive so that a very quick movement of its operated element to a circuit closing position may produce an indication, while, at all other times, this element is sufficiently removed from such position to prevent an accidental or premature contact under the influence of vibration.

In the event the nature of the material 14 of the heat detecting element 10 is such that the resistance decreases to an extremely low or negligible value at temperatures much higher than are to be detected, the flow of excessive current through relay 21 is prevented by the limiting resistor 15 in the arm 1. This resistor has a resistance of a value to enable the network to be unbalanced at the desired responsive temperature but which is sufficiently high to prevent such excessive current flow.

Since direct current produces a polarizing effect on certain types of heat detecting elements 10 which causes the element to act as a battery having a countervoltage tending to impair the accuracy of the element, it is desirable to use a source of alternating current, illustrated herein as a variable transformer for supplying current at a predetermined voltage. It will be understood that a transformer having several taps for supplying current at different desired voltages or any other source of alternating current may be utilized. In practice, alternating current at 110 volts, 400 cycles has been employed.

When alternating current is utilized, a second current blocking device 25 is provided which is connected in series with the resistor 18 in the arm 4 as shown. The blocking devices 24 and 25 as arranged herein thus serve as a half-wave rectifier for permitting the flow of current through the relay substantially only in a single direction, that is from left to right as viewed. The voltage characteristic of the current flow through the four arms of the network under normal temperature conditions is symbolically illustrated in Fig. 1. At the predetermined responsive temperature, current having a pulsating direct current characteristic will flow through the relay 21.

A condenser 26 may be shunted across the relay 21 if required because of the characteristics of the relay or because current at a low frequency is utilized.

In the circuit just described, the detecting element 10 has a negative temperature coefficient of resistivity; but the present invention can also be practiced by utilizing such an element having a positive temperature coefficient of resistivity, simply by reversing the terminals of the blocking devices 24 and 25 so that current can flow in opposite directions.

The circuit in accordance with the present invention also is adapted to be modified for detecting predetermined abnormal temperatures which are lower than a normal temperature by arranging the elements to enable current to flow through the relay at such lower temperature, and thus is not limited for use in the detection of flame or fire as described herein by way of example.

It will also be understood that the detecting element 10 may be of the semi-conductive type having a much lower normal temperature resistance for example about one thousand ohms and a proportionately lower abnormal temperature resistance, for example, about fifty ohms or less.

While the present invention has been described in connection with the detection of changes in temperature, it will be appreciated that the system can be utilized for detecting changes in other conditions such as humidity for example, by modifying the element 10 to render the same sensitive to such other conditions.

From the foregoing description, it will be seen that the present invention provides an improved condition responsive system of the character indicated which is constructed of small, lightweight, simple and inexpensive devices; is readily assembled without the aid of highly skilled labor; and is capable of being installed as an extremely small unit. The system is accurate and reliable in operation, and is fully capable of performing all the functions of more costly and bulky apparatus heretofore employed.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A temperature responsive alarm system comprising a normally unbalanced bridge circuit having in the first arm thereof an element adapted to be positioned in a zone subject to variations in temperature to indicate a predetermined temperature condition therein, said element including two spaced conductors of electricity spaced apart by material having one resistance at a normal temperature and having other resistances at predetermined balancing and responsive temperatures, said circuit having resistors in the second, third and fourth arms thereof, the resistance ratio of said second arm and said first arm and the resistance ratio of said third arm and said fourth arm being substantially the same only at the predetermined balancing temperature to balance the circuit and varying at all other temperatures; means for supplying alternating current to said branches of said circuit an alarm circuit; means responsive to the flow of unidirectional current connected across said branches at a point between said first and second arms and point between said third and fourth arms including switch means for controlling said alarm circuit; current blocking means arranged in said circuit between said first branch and said current responsive means for permitting the flow of current through said current responsive means substantially only in a single direction when said circuit is unbalanced and in such direction that said current responsive means is energized at temperatures between the balancing temperature and the responsive temperature; and current blocking means in said fourth arm, whereby alternating current is supplied to said first arm and unidirectional current is supplied to said responsive means at the responsive temperature.

2. A system according to claim 1 wherein a condenser is shunted across said current responsive means.

3. A system according to claim 1, wherein said first arm includes a limiting resistor connected in series with one of the conductors of said first mentioned element.

References Cited in the file of this patent

UNITED STATES PATENTS

| | | |
|---|---|---|
| 2,535,133 | Hoch | Dec. 26, 1950 |
| 2,553,603 | Peters | May 22, 1951 |
| 2,571,791 | Thompkins | Oct. 16, 1951 |
| 2,667,630 | Jorgensen | Jan. 26, 1954 |
| 2,686,293 | Davis | Aug. 10, 1954 |